July 24, 1962   G. L. OSWALT   3,045,311
MOLDING MACHINE
Filed May 3, 1961   3 Sheets-Sheet 1
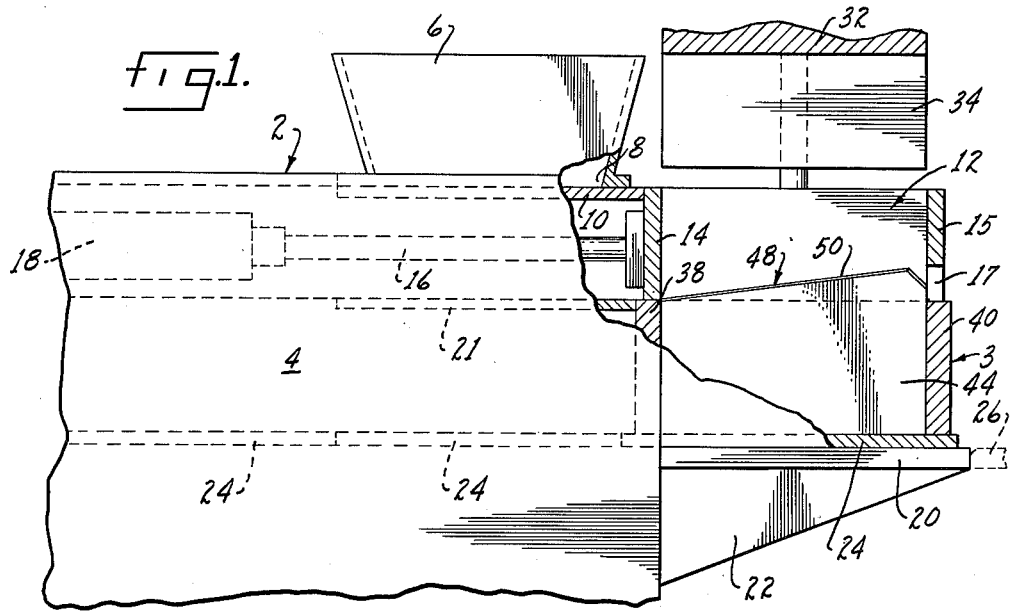
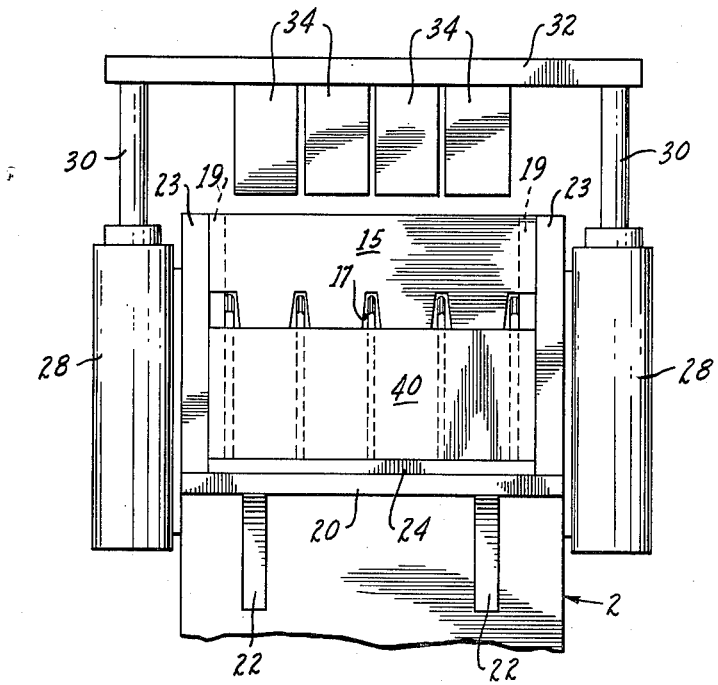
INVENTOR.
George L. Oswalt,
BY Parker & Carter
Attorneys.

July 24, 1962  G. L. OSWALT  3,045,311
MOLDING MACHINE
Filed May 3, 1961  3 Sheets-Sheet 2
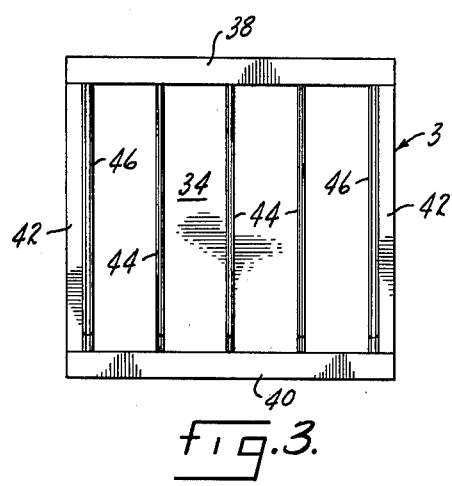
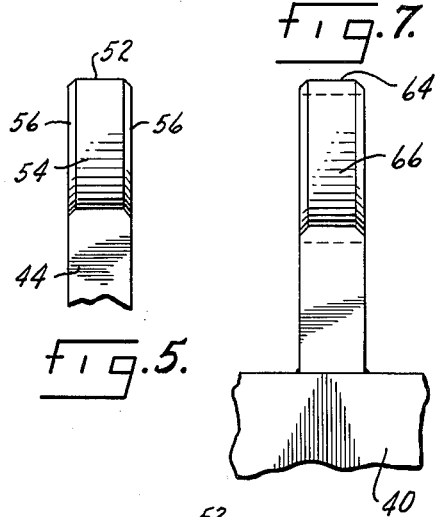
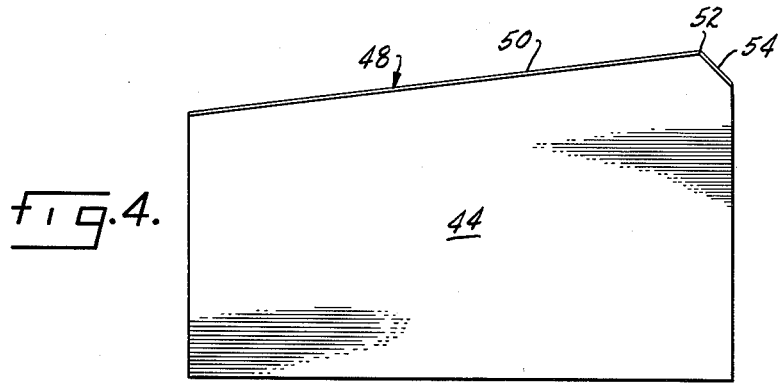
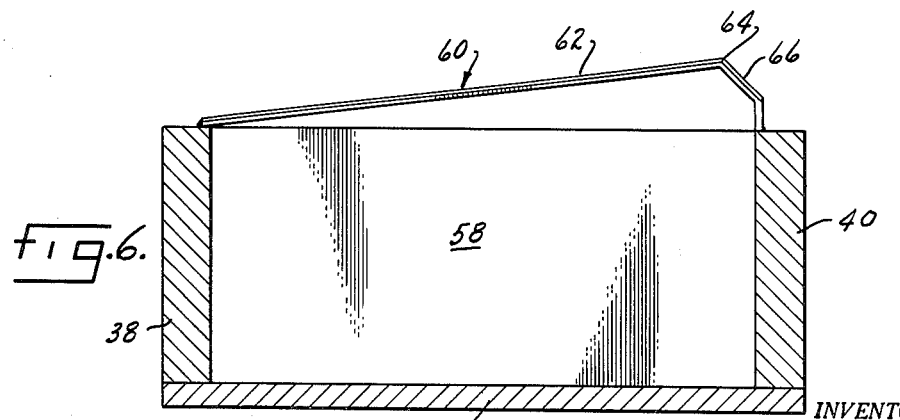
INVENTOR.
George L. Oswalt,
BY Parker & Carter
Attorneys.

July 24, 1962 G. L. OSWALT 3,045,311
MOLDING MACHINE

Filed May 3, 1961 3 Sheets-Sheet 3

INVENTOR:
George L. Oswalt,
BY Parker & Carter
Attorneys.

United States Patent Office 3,045,311
Patented July 24, 1962

3,045,311
MOLDING MACHINE
George L. Oswalt, 2012 N. 77th Ave., Elmwood Park, Ill.
Filed May 3, 1961, Ser. No. 107,556
11 Claims. (Cl. 25—103)

This invention relates in general to molding machines and more specifically to a machine for molding concrete or the like, wherein upright block molds are filled with a molding material by a gravity filling operation through the medium of a shuttling material load carrier. This application is a continuation-in-part of my copending applications, Serial Numbers 863,275, filed December 31, 1959, and 863,235, filed December 31, 1959, now abandoned.

A problem encountered in molding machines of this type has been that of insuring even distribution of molding material in the mold cavity. The back part of the mold is often over-fed while the front part is, to some degree, starved. This is a result of the fact that the load carrier or feed drawer moves from the back wall to the front wall of the cavity and in going forward drops an adequate amount of material from the front of the feed drawer in the back of the mold as it crosses the mold cavity, and if there is a deficiency of material to fill the mold properly it always occurs in the very front part of the mold.

Another problem with a molding machine such as described above is encountered when the machine is designed to mold a plurality of blocks and has several cavities separated by division walls. In molding machines embodying this construction the molding material has a tendency to overfill some of the cavities and underfill others. This is particularly true in the molding of relatively thin blocks of the order of approximately two inches thick. Heretofore, in fact, in casting blocks it has usually been necessary to cast them in a horizontal position which materially reduces molding speed.

Uneven deposition of molding material in the mold results in blocks of concrete or the like having widely varying texture and consequently different mechanical properties throughout. Blocks of very low overall tensile strength are often produced.

Agitating the shuttling load carrier has been the generally accepted method of maintaining generally proper molding material distribution in the mold. Mechanical agitators employing conventional electric motors or the like and eccentrics connecting the motors to the load carriers are used to agitate or shake the carrier to cause a somewhat even deposition of the material in the mold cavities as the load carrier traverses the top of the upright mold. Mechanical agitators, however, are relatively complicated devices requiring a number of moving parts and relatively high maintenance costs in addition to the initial cost. In addition, the agitating operation itself prolongs each molding operation and thus further limits molding speed.

Accordingly, it is the object of this invention to provide a mold for use in molding machines which eliminates the agitator and the agitating function, and yet provides an even distribution of molding material in the mold cavities.

It is a further object of this invention to provide a mold for use in molding machines which has therein self-contained means for insuring even distribution of molding material in the mold cavity, and which increases the overall speed of the molding operation while also improving block characteristics.

Yet another object of this invention is to provide several embodiments of the aforementioned mold construction for accomplishing the ends set forth above.

Still another object of this invention is to provide a mold for use in molding machines which overcomes the difficulty of uneven distribution of molding material in mold cavities and yet is simple in construction and economical to manufacture.

Other objects of my invention will appear in the following specification and claims wherein like reference numerals identify like parts throughout.

In the drawings:

FIGURE 1 is a side elevation of a molding machine using a mold embodying my invention, parts being shown in section;

FIGURE 2 is a front end elevation;

FIGURE 3 is a plan view of the mold element;

FIGURE 4 is a side elevation of a division plate or a side liner embodying one form of my invention;

FIGURE 5 is a partial front elevation of the division plate or side liner shown in FIGURE 4;

FIGURE 6 is a side elevation of a molding material control means comprising a ramp bar and embodying another form of my invention;

FIGURE 7 is a partial front elevation of the embodiment shown in FIGURE 6;

Figure 8:
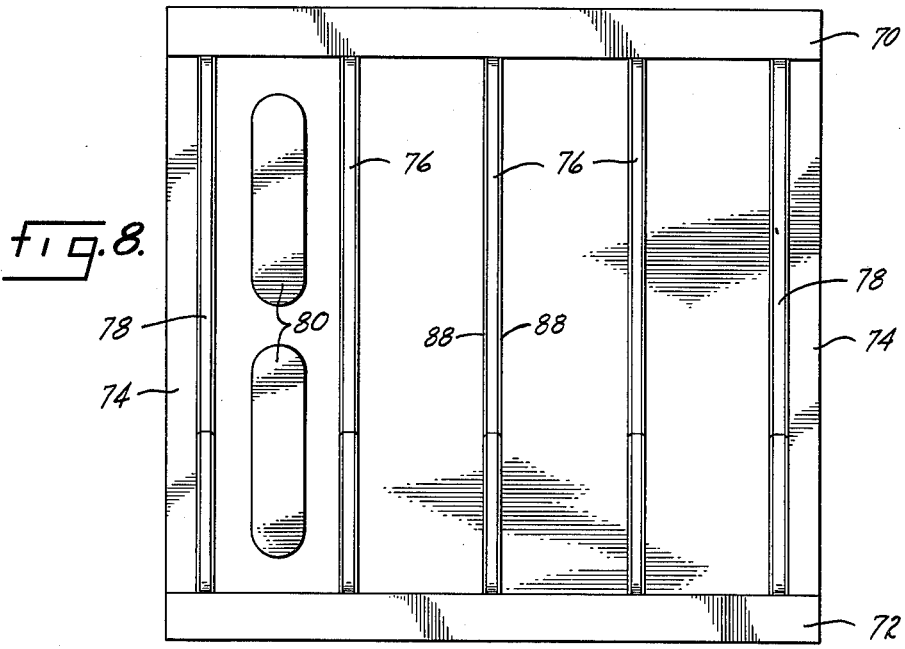
FIGURE 8 is a plan view of a modified mold cavity.

In the drawings there is illustrated a conventional molding machine generally denoted by the reference numeral 2, its construction being conventional except as to the mold element 3. The machine comprises framework 4 having a hopper 6 on top thereof into which molding material is delivered from a suitable source. The hopper is mounted over opening 8 in the framework, which opening is closed by a slide plate 10 attached to the back wall 14 of a shuttling load carrier 12. Load carrier 12 has a front wall 15 having notches 17 therein, the significance of which will subsequently be explained. Side walls 19 connect the front and back walls and the top and bottom remain open. The shuttling load carrier is moved from the load delivering position shown in the drawings to a position beneath the opening 7 by a piston rod 16 reciprocated by fluid motor 18 in a conventional manner. The load carrier is supported by slide 21 and guided by side frames 23.

On the front of the framework 4 is a mold support 20 braced by brackets 22. A mold pallet 24 rests on support 20 and provides a removable bottom for the mold 3. Pallets 24 are fed through the framework from the rear onto the supporting platform 20 by a conventional means. After each molding operation a mold pallet and mold move off the supporting plate onto a receiving table 26.

As best shown in FIGURE 2, supported from the framework are fluid motors 28 having piston rods 30 extending upwardly therefrom. Depending from crossbar 32 connecting said piston rods are male mold inserts 34. After each molding operation the mold inserts are moved downwardly by the fluid motor into the mold cavity to apply pressure to the molding material and compress the material within the cavities.

The mold 3 is shown generally in FIGURE 1 and more specifically in FIGURES 3 and 6. Mold 3 is comprised of an end wall 38 and a front wall 40 connected by side walls 42.

In one embodiment of the material control means, as shown in FIGURES 3, 4 and 5, division plates 44 divide the large mold cavity into a number of mold cavities and side liners 46 having configurations identical to those of the division plates are mounted against the end walls 42 of the mold to provide outside liners for the exterior mold cavities. As seen in FIGURES 1 and 4, the upper edges 48 of the division plates 44 and the side liners 46 present a ramp-like appearance and extend gradually and progressively upwardly as at 50 to a point 52 whereupon they extend progressively downwardly as at 54 to the front wall 40 of the mold. The edge or extension 48 may have bevelled side edges 56 as shown in FIGURE 5.

Another embodiment of this material control means is shown in FIGURES 6 and 7. Here the divider plates 58 and side liner (not shown) are rectangular in configuration and reach only the top of the mold walls. Extending from the back wall 38 to the front wall 40 and secured thereto by any suitable means are molding material deposit control bars or extensions 60 which are, in upper edge configuration, substantially identical to the upper edges 48 of the division plates and side liners of the first embodiment of this invention. The deposit control bars extend gradually and progressively upwardly as at 62 to a point 64, whereupon they extend downwardly as at 66 to be connected to the front wall 40 of the mold. A control bar 60 may be mounted over each division plate in the mold cavity and over each of the side liners.

Figure 9:
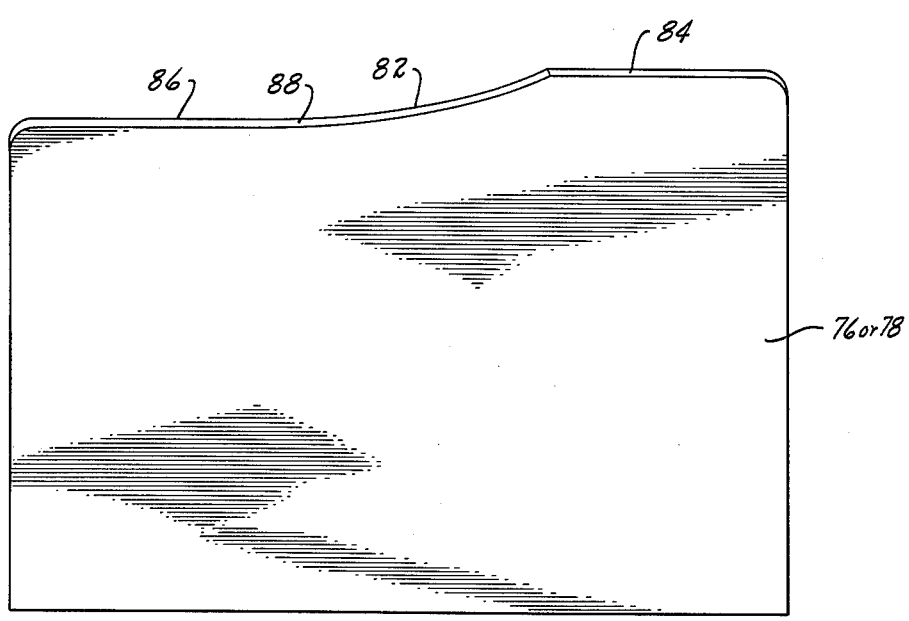
FIGURE 9 is a side view of a modified form of division plate or side liner.

FIGURES 8 and 9 show a further form of the invention in which the mold element includes a back wall 70 and a front wall 72 connected together by side walls 74. Positioned in spaced relation within the mold cavity are a plurality of division walls or dividers 76 and a side liner 78, substantially similar to the dividers 76, and positioned adjacent each of the side walls 74. I may position mold forming elements 80 in one or more of the mold cavities defined by the dividers and side liners. The mold forming elements 80 are merely for purposes of illustration and form no part of the present invention.

FIGURE 9 is a side view of the dividers or side liners shown in FIGURE 8. As was the case in the other forms of the invention, the side liners and dividers include an upward extension which projects into the bottom of the shuttle in order to agitate the mold material and thus provide a generally even deposit of mold material from back to front. In FIGURE 9 there is a somewhat arcuate upwardly inclined section 82 which is generally intermediate the front and back walls of the mold. The section 82 is joined by an upper section 84 which is above the level of the side walls 74 and a somewhat lower section 86 which is generally at the level of the side walls. The sections 84 and 86 are generally level and together with the upwardly inclined section 82 form the top of each of the dividers and side liners. The section 82, as shown herein, is slightly concave; however, it may also be convex. The upper edge of the extension may have tapered sides, as at 88, shown in FIGURE 8. In addition, the extensions of FIGURE 9 may be formed by a bar or rod, as in FIGURE 6.

The use, operation and function of this invention are as follows:

Shuttling material load carrier 12 is retracted to a position under the hopper 6 and a predetermined amount of molding material is deposited in the load carrier from the hopper. A mold is in place, as shown in FIGURE 1, and an embodiment of my invention provides a ramped material deposit control means extending upwardly out of the mold cavity. The piston rod 16 is then gradually extended and the aggregate load carrier 12 moves forwardly. The front wall 15 of the load carrier, having notches 17 therein, passes the back or cut-off wall 38 of the mold and proceeds over the gradually rising upper edges 50 of the division plates or side liners or 62 of the control bar to begin depositing material in the mold cavities. As the load carrier moves forward the edges 50, 62 or 82 gradually extend further into the material which has a tendency, due to its consistency, not to drop immediately and entirely into the mold cavity. The deposit control means extend further upwardly into the material as the load carrier traverses the mold cavity and contact and agitate an increasingly greater amount of the material which has remained in the load carrier. As a result of this continuously increasing amount of agitation of the retained molding material, there is a tendency to deposit more material in the front of the mold cavities than in the rear of the mold cavities. Since the initial tendency of the traversing load is to deposit a substantial amount in the back of the mold cavities due to the force of gravity acting on the material a compensating effect is obtained by the deposit control means and a uniformity of deposition of material in the mold cavities is obtained throughout the length of the mold. A uniform distribution between the individual mold cavities is also obtained since the material, as it is agitated by the progressively rising upper edges of the division plates and side liners or control bar, deposits substantially the same amount of molding material on either side of the upper edge of each of the division plates or control bars.

Thus the essence of this invention lies in the configuration of the upper edge of the division plates or side liners in one embodiment of this invention and the configuration of the deposit control bars in a second embodiment of this invention. All forms of the invention include a means for agitating the mold to a gradually increasing extent as the shuttle moves from the back to the front. The resulting effect provides the agitation found necessary to produce an even distribution of molding material in the individual mold cavities and between the mold cavities, and provides a simple and economical improvement over the mechanical motor-driven load carrier agitator.

Although the invention has been described in connection with a molding mechanism wherein a shuttle moves back and forth from the mold hopper to the mold cavity, it should be understood that the configuration of the division plates or side liners is also useful in a mechanism in which the mold moves back and forth beneath a stationary shuttle or mold container. In such an arrangement, the shuttle or mold container would be positioned beneath the hopper and the mold cavity would move back and forth to receive molding material. What is important is that the shuttle and mold cavity be relatively movable and that the extensions above the mold cavity extend into the bottom of the shuttle in such a manner that the mold material is increasingly agitated as the cavity and shuttle are aligned.

The foregoing description of this invention is intended to be illustrative only, and not definitive, and it is intended that the scope of this invention be limited only by the appended claims.

I claim:

1. A molding mechanism including a mold having front, back and side walls defining an open top mold cavity, a shuttle movable back and forth over said open top mold cavity in a direction generally parallel to said side walls to deposit molding material in said cavity, said shuttle having an opening in the lower part of the leading edge, and means for agitating the mold material in the shuttle to provide a generally even deposit of molding material, from back to front, as said shuttle moves across said cavity including an upwardly inclined extension above said side wall, aligned with the opening in the leading edge of the shuttle, and projecting into the bottom of the shuttle, said extension rising above the level of the top of the side wall and being gradually upwardly inclined in the direction of movement of the shuttle.

2. The structure of claim 1 further characterized in that said extension includes an intermediate, somewhat arcuate, upwardly inclined section, beginning at a point spaced from the mold back wall and rising from the level of the top side wall toward the front wall, and a generally level section joining the upper end of said inclined section above the level of said side wall.

3. The structure of claim 1 further characterized in that said upwardly inclined extension begins at the mold back wall and rises gradually and uniformly upwardly from the level of the top of the side wall toward the mold front wall.

4. A molding mechanism including a mold having front, back and side walls defining an open top mold cavity, a plurality of spaced dividers positioned in said cavity and generally parallel to said side walls, a shuttle movable back and forth over said open top mold cavity in a direction generally parallel to said side walls to deposit molding material in said cavity, said shuttle having openings in the lower part of the leading edge, and means for agitating the mold material in the shuttle to provide a generally even deposit of molding material, from back to front, as said shuttle moves across said cavity, including extensions rising above each of said dividers and projecting into the bottom of the shuttle, each extension being aligned with an opening in the shuttle and including an upwardly inclined ramp, inclined in the direction of movement of the shuttle, and beginning at the mold back wall and rising gradually and uniformly upwardly to a position above the top of the mold side walls.

5. The structure of claim 4 further characterized in that each of said ramps have bevelled sides.

6. The structure of claim 4 further characterized in that said extensions and ramps are integral with and form a solid continuation of said dividers.

7. The structure of claim 4 further characterized in that each of said ramps is formed by a bar mounted on top of the divider and upwardly inclined from the back wall of the mold toward the front wall.

8. A molding mechanism including a mold having front, back and side walls defining an open top mold cavity, a plurality of spaced dividers positioned in said cavity and generally parallel to said side walls, a shuttle movable back and forth over said open top mold cavity in a direction generally parallel to said side walls to deposit molding material in said cavity, said shuttle having openings in the lower part of the leading edge, and means for agitating the mold material in the shuttle to provide a generally even deposit of molding material, from back to front, as said shuttle moves across said cavity including extensions rising above each of said dividers and projecting into the bottom of the shuttle, each extension being aligned with an opening in the shuttle and including an intermediate, somewhat arcuate, upwardly inclined section, inclined in the direction of movement of the shuttle, and a generally level section joining each of said inclined sections at its upper end.

9. In a concrete block-making machine, a mold having front, back and side walls defining an open top mold cavity, means for supporting said mold in a position to receive a concrete mix, a plurality of spaced dividers positioned in said cavity and generally parallel to said side walls, a liner positioned adjacent each side wall and substantially similar to size and shape to said dividers, a shuttle having front, back and side walls movable back and forth over said open top cavity in a direction generally parallel to said side walls and the dividers to deposit a concrete mix in said mold cavity, said shuttle front wall having openings in the lower edge thereof generally in alignment with said dividers and liners, a hopper for depositing concrete mix in said shuttle and means for moving said shuttle back and forth between said hopper and said mold cavity, and means for agitating the concrete mix in the shuttle to provide a generally even deposit of said mix as the shuttle moves across said mold cavity, including upwardly inclined extensions of said dividers and liners projecting into the bottom of said shuttle and being aligned with the openings in the lower front of the shuttle, said extensions rising above the level of the top of the side walls and being gradually upwardly inclined in the direction of movement of the shuttle.

10. The structure of claim 9 further characterized in that said extensions extend gradually and progressively further into the shuttle as said shuttle moves from the back toward the front wall of the mold cavity.

11. A molding mechanism including a mold having front, back and side walls defining an open top mold cavity, means for depositing mold material in the mold cavity including a mold container having front, back and side walls and an open bottom, said mold container front wall having an opening at the lower edge, said mold container and mold cavity being spaced, one from the other, and relatively movable so that mold material may be deposited in the cavity when the open bottom of the mold container is positioned above the open top cavity, and means for agitating the mold material in the mold container to provide a generally even deposit of mold material in the cavity, from back to front, as said mold container and cavity are aligned including an upwardly inclined extension above the cavity side wall aligned with the opening in the front wall of the mold container, and projecting into the bottom of the mold container, said extension rising above the level of the top of the cavity side wall and being generally upwardly inclined in a direction to project deeper into the mold container as said mold container and cavity are aligned.

No references cited.